United States Patent
Kawai

(10) Patent No.: US 9,772,641 B2
(45) Date of Patent: Sep. 26, 2017

(54) CONTROL DEVICE INCLUDING POWER SUPPLY CONTROLLER, CONTROL METHOD OF CONTROLLING POWER SUPPLY OF MACHINE, AND RECORDING MEDIUM IN WHICH PROGRAM FOR CONTROLLING POWER SUPPLY OF MACHINE IS STORED

(75) Inventor: Wakahiro Kawai, Shiga (JP)

(73) Assignee: OMRON Corporation, Kyoto (JP)

( * ) Notice: Subject to any disclaimer, the term of this patent is extended or adjusted under 35 U.S.C. 154(b) by 611 days.

(21) Appl. No.: 14/360,242

(22) PCT Filed: Aug. 30, 2012

(86) PCT No.: PCT/JP2012/071950
§ 371 (c)(1),
(2), (4) Date: May 22, 2014

(87) PCT Pub. No.: WO2013/088787
PCT Pub. Date: Jun. 20, 2013

(65) Prior Publication Data
US 2014/0316602 A1     Oct. 23, 2014

(30) Foreign Application Priority Data

Dec. 12, 2011  (JP) .................................. 2011-271584
Mar. 12, 2012  (JP) .................................. 2012-054995

(51) Int. Cl.
*G05F 1/66*      (2006.01)
*G05B 15/02*    (2006.01)
(Continued)

(52) U.S. Cl.
CPC .............. *G05F 1/66* (2013.01); *G05B 15/02* (2013.01); *G05B 19/41865* (2013.01);
(Continued)

(58) Field of Classification Search
CPC ..... G05F 1/66; G05B 15/02; G05B 19/41865; H02J 3/14
See application file for complete search history.

(56) References Cited

U.S. PATENT DOCUMENTS 5,293,024 A  *  3/1994  Sugahara ............... B23K 26/08
                                                          219/121.67
6,060,697 A      5/2000  Morita et al.
(Continued)

FOREIGN PATENT DOCUMENTS

CN    1230303 A    9/1999
CN    1728523 A    2/2006
(Continued)

OTHER PUBLICATIONS

International Search Report issued in PCT/JP2012/071950 dated Nov. 27, 2012 (2 pages).
(Continued)

*Primary Examiner* — Sean Shechtman
*Assistant Examiner* — Michael W Choi
(74) *Attorney, Agent, or Firm* — Osha Liang LLP

(57) ABSTRACT

A control device has a monitoring section that monitors an amount of electric energy of a first machine, and a power supply controller that controls power supply of a second machine in accordance with an amount of electric energy of the first machine and schedule information indicative of an operation schedule of each of the first machine and the second machine.

1 Claim, 6 Drawing Sheets

(51) Int. Cl.
*H02J 3/14* (2006.01)
*G05B 19/418* (2006.01)
(52) U.S. Cl.
CPC ...... *H02J 3/14* (2013.01); *G05B 2219/25391* (2013.01); *G05B 2219/32021* (2013.01); *G05B 2219/34306* (2013.01); *Y02B 70/3225* (2013.01); *Y02P 70/161* (2015.11); *Y02P 70/163* (2015.11); *Y02P 80/11* (2015.11); *Y02P 80/114* (2015.11); *Y02P 90/20* (2015.11); *Y02P 90/205* (2015.11); *Y04S 20/222* (2013.01)

(56) References Cited

U.S. PATENT DOCUMENTS

| | | | |
|---|---|---|---|
| 6,105,138 | A | 8/2000 | Arakawa et al. |
| 6,188,142 | B1 | 2/2001 | Loth-Krausser |
| 6,303,395 | B1 | 10/2001 | Nulman |
| 6,392,318 | B1 | 5/2002 | Griffis |
| 6,583,386 | B1* | 6/2003 | Ivkovich ............. B23K 9/0953 219/125.1 |
| 7,208,697 | B2 | 4/2007 | Blankenship et al. |
| 8,346,596 | B2* | 1/2013 | Reaume ............. G05B 19/41865 705/7.36 |
| 2004/0230851 | A1 | 11/2004 | Chao et al. |
| 2006/0023477 | A1 | 2/2006 | Lee |
| 2006/0052898 | A1* | 3/2006 | Blumenfeld ..... G05B 19/41865 700/108 |
| 2006/0156044 | A1 | 7/2006 | Shimizu et al. |
| 2007/0050093 | A1* | 3/2007 | Furukawa ......... H01L 21/67276 700/295 |
| 2007/0227448 | A1* | 10/2007 | Tomine ............ G05B 19/41865 118/695 |
| 2007/0270992 | A1 | 11/2007 | Nishida et al. |
| 2007/0293969 | A1 | 12/2007 | Hirai et al. |
| 2008/0077817 | A1 | 3/2008 | Brundridge et al. |
| 2008/0172312 | A1 | 7/2008 | Synesiou et al. |
| 2010/0106992 | A1 | 4/2010 | Schauer |
| 2010/0187914 | A1 | 7/2010 | Rada et al. |
| 2010/0194358 | A1* | 8/2010 | Stanford-Clark ....... H02J 9/005 323/234 |
| 2010/0268369 | A1 | 10/2010 | Ogata |
| 2011/0025517 | A1 | 2/2011 | Kobayashi et al. |
| 2011/0093125 | A1 | 4/2011 | Schoeman et al. |
| 2011/0112698 | A1 | 5/2011 | Edwards |
| 2011/0115622 | A1 | 5/2011 | Sadwick |
| 2011/0119515 | A1 | 5/2011 | Sadwick et al. |
| 2011/0138202 | A1* | 6/2011 | Inoue .................... G06Q 10/04 713/310 |
| 2011/0144791 | A1 | 6/2011 | Loldj et al. |
| 2011/0172792 | A1* | 7/2011 | Shinohara .............. G06Q 50/06 700/90 |
| 2011/0172838 | A1* | 7/2011 | Pai .......................... G05B 15/02 700/292 |
| 2012/0084030 | A1 | 4/2012 | Kitagawa et al. |
| 2012/0084031 | A1 | 4/2012 | Saito et al. |
| 2012/0290231 | A1* | 11/2012 | Sogou .................... G06Q 10/06 702/61 |
| 2013/0211844 | A1 | 8/2013 | Sadwick |
| 2013/0331959 | A1 | 12/2013 | Kawai |

FOREIGN PATENT DOCUMENTS

| | | |
|---|---|---|
| DE | 102005057270 A1 | 6/2007 |
| DE | 102008001777 A1 | 11/2009 |
| JP | H10-322906 A | 12/1998 |
| JP | 11-237933 A | 8/1999 |
| JP | 2000-260672 A | 9/2000 |
| JP | 2000-339024 A | 12/2000 |
| JP | 2001-320199 A | 11/2001 |
| JP | 2002-062917 A | 2/2002 |
| JP | 2003-143762 A | 5/2003 |
| JP | 2005-092827 A | 4/2005 |
| JP | 2005-293546 A | 10/2005 |
| JP | 2006-011897 A | 1/2006 |
| JP | 2006-277131 A | 10/2006 |
| JP | 2006-310750 A | 11/2006 |
| JP | 2008-306835 A | 12/2008 |
| JP | 2010-146454 A | 7/2010 |
| JP | 2010-250381 A | 11/2010 |
| JP | 2011-036003 A | 2/2011 |
| JP | 2011-090542 A | 5/2011 |
| JP | 4775516 B1 | 9/2011 |
| KR | 10-2003-0057236 A | 7/2003 |
| KR | 10-2011-0128830 A | 11/2011 |
| TW | 332875 | 6/1998 |
| TW | 200424834 A | 11/2004 |
| TW | 200821816 A | 5/2008 |
| TW | 311008 B | 6/2009 |
| TW | 201103223 A | 1/2011 |
| TW | 201108547 A | 3/2011 |
| WO | 2010/116989 A1 | 10/2010 |

OTHER PUBLICATIONS

Written Opinion of the International Searching Authority issued in PCT/JP2012/071950 dated Nov. 27, 2012 (4 pages).
Extended European Search Report issued in corresponding European Application No. 12856991.0, dated Mar. 26, 2015 (8 pages).
International Search Report for corresponding International Application No. PCT/JP2011/056451, dated Jun. 7, 2011 (3 pages).
Written Opinion for corresponding International Application No. PCT/JP2011/056451, dated Jun. 7, 2011 (3 pages).
Extended European Search Report issued in corresponding European Application No. 11860848.8, dated Nov. 6, 2013 (8 pages).
A. Cannata et al; "Energy efficiency driven process analysis and optimization in discrete manufacturing"; IEEE, pp. 4449-4454; Nov. 3, 2009 (6 pages).
S. Kamouskos et al; "Towards the Energy Efficient Future Factory"; IEEE, pp. 367-371; Jun. 23, 2009 (5 pages).
K. Bunse et al; "Integrating energy efficiency performance in production management—gap analysis between indutrial needs and scientific literature"; Journal of Cleaner Production, pp. 667-679; Nov. 17, 2010 (13 pages).
Office Action issued in Taiwanese Application No. 101105935, dated Apr. 8, 2014 (11 pages).
Office Action issued in Taiwanese Application No. 101105932, dated Apr. 14, 2014 (12 pages).
International Search Report for corresponding International Application No. PCT/JP2012/052931, dated May 1, 2012 (3 pages).
Written Opinion for corresponding International Application No. PCT/JP2012/052931, dated May 1, 2012 (7 pages).
Office Action issued in corresponding Japanese Application No. 2011-143498, dated Jun. 24, 2014 (4 pages).
First Notice of the Opinion on Examination issued in corresponding Chinese Application No. 201180068020.7, dated Jan. 21, 2015 (23 pages).
Office Action issued in corresponding U.S. Appl. No. 14/000,452, dated Jan. 15, 2016 (14 pages).
Office Action issued in corresponding U.S. Appl. No. 14/000,452, dated Aug. 3, 2016 (27 pages).
Office Action issued in corresponding Korean Application No. 2014-7013348, dated Nov. 17, 2015 (8 pages).
Office Action issued in corresponding Chinese Application No. 201280057041.3, dated Sep. 2, 2015 (17 pages).
International Preliminary Report on Patentability issued in PCT/JP2012/071950, dated Jun. 26, 2014 (8 pages).
Office Action issued in corresponding European Application No. 12856991.0, dated Oct. 12, 2016 (6 pages).
Notice of Allowance issued in corresponding Korean Application No. 10-2014-7013348, dated Feb. 29, 2016 (2 pages).
Final Office Action issued in corresponding U.S. Appl. No. 14/000,452, dated Feb. 7, 2017 (25 pages).

* cited by examiner

FIG. 3

| SCHEDULED STOP TIME | SCHEDULED START-UP TIME |
|---|---|
| 2011/11/ 1  22:00 | 2011/11/ 1  23:00 |
| 2011/11/ 2   8:00 | 2011/11/ 2   9:00 |
| 2011/11/ 2  12:00 | 2011/11/ 2  13:00 |
| 2011/11/ 2  22:00 | 2011/11/ 4   9:00 |
| ⋮ | ⋮ |

FIG. 4

| SCHEDULED STOP TIME PERIOD | | LONG/SHORT PERIOD |
|---|---|---|
| SCHEDULED START TIME | SCHEDULED FINISH TIME | |
| 2011/11/ 1  22:00 | 2011/11/ 1  23:00 | SHORT PERIOD |
| 2011/11/ 2   8:00 | 2011/11/ 2   9:00 | SHORT PERIOD |
| 2011/11/ 2  12:00 | 2011/11/ 2  13:00 | SHORT PERIOD |
| 2011/11/ 2  22:00 | 2011/11/ 4   9:00 | LONG PERIOD |
| ⋮ | ⋮ | ⋮ |

CONTROL DEVICE INCLUDING POWER SUPPLY CONTROLLER, CONTROL METHOD OF CONTROLLING POWER SUPPLY OF MACHINE, AND RECORDING MEDIUM IN WHICH PROGRAM FOR CONTROLLING POWER SUPPLY OF MACHINE IS STORED

BACKGROUND

Technical Field

The present invention relates to control of power supply of a plurality of machines which operate in association with each other. Particularly, the present invention relates to a device, a method, a program, and a recording medium, each of which is for controlling the power supply of the plurality of machines.

Related Art

Conventionally, there has been known manufacturing lines in which a plurality of machines (automated machines) successively carry out processing or assembly of electronic parts or mechanism parts. According to such manufacturing lines, all of the plurality of machines are simultaneously turned on. Then, a start timing of the processing or the assembly is controlled based on detection, by a sensor such as a photoelectric sensor and a limit switch, of an object to be subjected to the processing or the assembly. Therefore, the plurality of machines are always turned on and, consequently, consume standby electric power which does not contribute to manufacturing. Further, in a case where a heat treatment device, such as a molding machine, a reflow furnace, or a drier, is provided in the manufacturing line, the heat treatment device is controlled so that a temperature in furnace is kept high, for the purpose of reduction in time for increasing the temperature in the furnace to an appropriate temperature. This causes the heat treatment device to operate even in a case where no object to be subjected to the processing or the assembly exists in the furnace. It follows that the heat treatment device consumes electric power due to such idle operation.

FIG. 7 is a view illustrating changes per unit of time in amounts of electric power consumption in a manufacturing line in which machines A through D are arranged in this order. Note here that the machine A is a metal press, the machine B is an injection molding machine, the machine C is an inspection device, and the machine D is an exhaust fan. According to FIG. 7, during a time period "a", the manufacturing line is in normal operation, and each of the machines A though D consumes some degree of electric power. In contrast, during time periods b through e, part of the machines A through D consumes no electric power or only a small amount of electric power, and processing of a product is not carried out.

For example, during the time period "b", the machine A is stopped. Accordingly, a workpiece (an object to be processed) is not supplied from the machine A to the machines B though D. That is, the machines B through D cannot process the workpiece. It follows that electric power consumed by the machines B though D is wasteful standby electric power which is not concerned with manufacturing.

The time period "c" is a time period during which an operator switches with another operator at night. During the time period "c", the machines A and D are turned off, while the machines B and C are turned on so as to be in a standby state. In a case where a standby time is short, the machine B, which is an injection molding machine, needs to perform warm-up operation because the machine B requires time to be restarted after being turned off. Meanwhile, the machine C, which is an inspection device, does not require time to be restarted. It follows that the machine C consumes wasteful standby electric power.

The time period "d" is a time period during which an operator switches to another operator in morning. During the time period "d" herein, it is forgotten to turn off the machine D, which is an exhaust fan. In this case, the machine D consumes wasteful electric power. The time period "e" is a time period during which the manufacturing line is not in operation (non-operation day). During the time period "e" herein, it is forgotten to turn off the machine C, which is an inspection device. In this case, the machine C consumes wasteful electric power.

Due to a recent growing recognition of importance of a reduction in carbon dioxide, reduction in standby electric power or wasteful electric power consumption caused by idle operation described above has been demanded.

It has been considered to control a standby time of each machine or idle operation performed by each machine by monitoring, in detail, a workpiece being transferred with the use of a plurality of sensors such as photoelectric sensors and limit switches. However, a state of a workpiece, the number of workpieces, a frequency of transfer of a workpiece vary depending on a machine. However, a most suitable sensor should be selected for each machine or a control condition should be set for each machine. Furthermore, an increase in number of sensors causes an increase in facility cost.

Patent Literature 1 discloses a technique of controlling power supply of each machine to be turned on/off with the use of a controller with reference to schedule information indicative of an operation schedule time table of the each machine. With this, the each machine is caused to be in standby state or perform idle operation in accordance with the operation schedule time table, thereby reducing electric power consumption. However, with high frequency, progress in a manufacturing line changes, so that the progress is behind or ahead the schedule. In this event, even though it is necessary to operate the each machine regardless of the schedule, the power supply of the each machine is automatically turned off in accordance of the schedule. Therefore, it is difficult to employ this technique from a practical aspect.

According to the method for controlling a manufacturing line disclosed in Patent Literature 2, a monitoring section which monitors an amount of electric energy is provided to at least one of machines provided in a manufacturing line. By controlling a power supply control section of another machine in accordance with the amount of electric energy monitored by the monitoring section, wasteful electric power consumption is suppressed.

CITATION LIST

Patent Literature 1

Japanese Patent Application Publication, Tokukaihei, No. 11-237933 A (Publication Date: Aug. 31, 1999)

Patent Literature 2

Japanese Patent, No. 4775516 B (Publication Date: Sep. 21, 2011)

SUMMARY

However, the technique disclosed in Patent Literature 2 does not consider which state of the manufacturing line an increase or a reduction in amount of electric energy of a machine is attributed to. Therefore, it may not be possible to select the most suitable condition on which the power supply control section is controlled. For example, it is not clear whether a reduction in amount of electric energy of a machine is attributed to a short stop of the machine due to waiting for a material to be supplied or attributed to a stop of the machine in accordance with a schedule. Therefore, even in a case of a short stop of the machine due to waiting for a material to be supplied, there is a possibility of turning off the other machines. In this case, time is required to restart the other machines and that additional electric power is required.

Further, there is a case where not only manufacturing lines, but also other systems including a plurality of machines as well are not operated in accordance with an operation schedule, so that an inconvenience is caused to users of the plurality of machines. For example, a system including a plurality of elevators may be arranged such that some of the plurality of elevators are stopped in accordance with a schedule during a time period during which a use frequency of the plurality of elevators is expected to be low. However, in a case where the use frequency of the plurality of elevators increases due to a special matter, a user is inconvenienced because the number of available elevators is low. Even in a case of such a system that includes a plurality of machines, it is desired to suppress wasteful electric power consumption as much as possible without inconveniencing a user.

One or more embodiments of the present invention provides a control device and a control method, each of which is capable of controlling, at a suitable timing, power supply of a machine which operates in association with another machine, so as to suppress wasteful electric consumption.

A control device according to one or more embodiments of the present invention includes: a monitoring section for monitoring an amount of electric energy of a first machine; and a power supply control section for controlling power supply of a second machine in accordance with (i) the amount of electric energy of the first machine and (ii) schedule information indicative of an operation schedule of each of the first machine and the second machine.

Thus, according to the control device and the control method of one or more embodiments of the present invention, in order to suppress wasteful electric power consumption, it is possible to control, at a suitable timing, power supply of a machine which operates in association with another machine.

BRIEF DESCRIPTION OF DRAWINGS

FIG. 3 is a view illustrating an example of schedule information generated by an information system.

FIG. 4 is a view illustrating an example of stop time period information stored in a stop time period information storing section of the control device.

DETAILED DESCRIPTION

The following description will discuss embodiments of the present invention with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1:
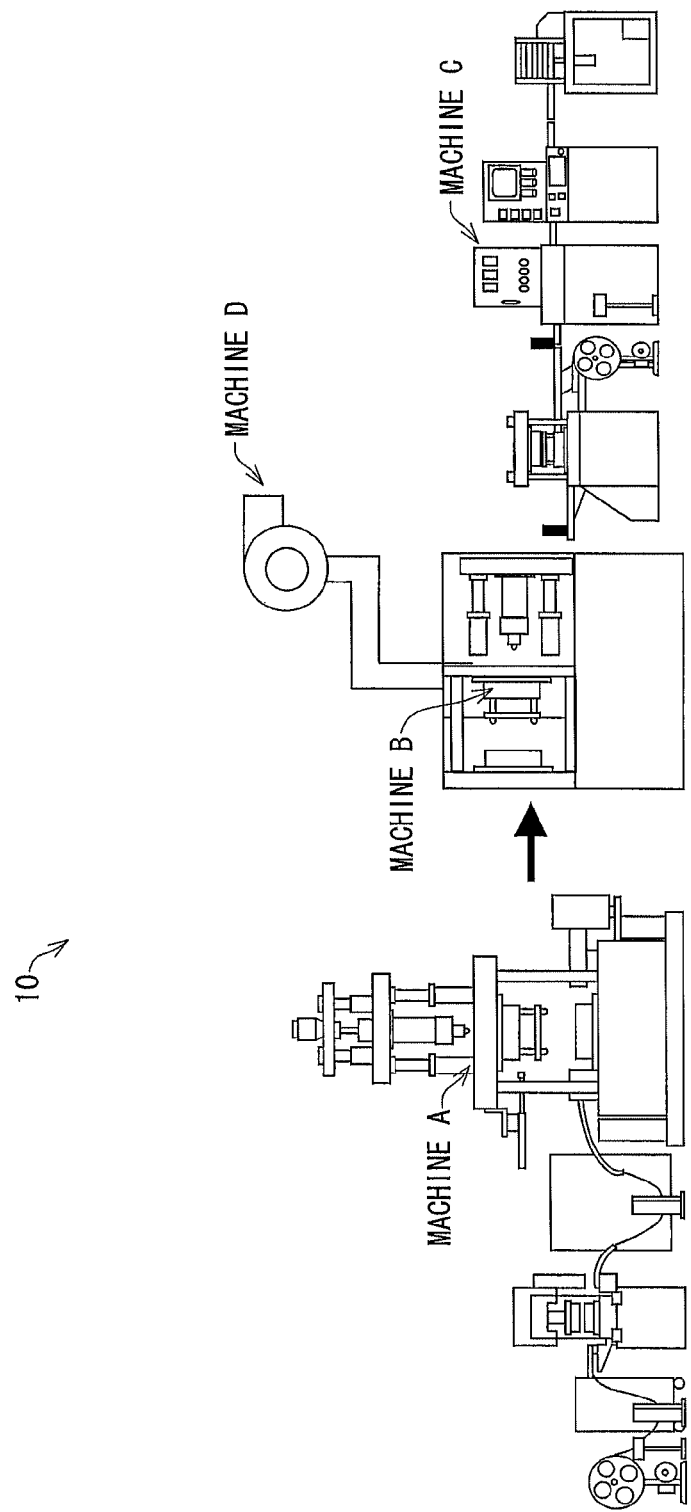
FIG. 1 is a view schematically illustrating a manufacturing line.

FIG. 1 is a view schematically illustrating a configuration of a manufacturing line in accordance with embodiments of the present invention.

<Configuration of Manufacturing Line>

A manufacturing line 10 (line) according to one or more embodiments of the present invention is a line including machines A through D. The manufacturing line 10 is configured such that each of the machines A through D processes a workpiece being transferred thereto. According to the manufacturing line 10, the machines A through D operate in association with each other. Note that the workpiece means an object to be processed in the line. In one or more embodiments of the present invention, the workpiece to be processed in the manufacturing line 10 is supposed to be a component for use in an electronic circuit.

The machine A is a metal-processing press for pressing a workpiece. The machine B is an injection molding machine for insert molding, together with a resin material, the workpiece (for example, a metal terminal) processed by the machine A. The machine C is an inspection device for inspecting the workpiece processed by the machine B. The machine D is an exhaust fan for exhausting high-temperature gas generated during the molding process carried out by the machine B, which is an injection molding machine.

Each of the machines A through D has a switch via which power supply of the each of the machines A through D is turned on/off. It is therefore possible for an operator (worker) to manually turn on/off the power supply of each of the machines A though D by directly operating the switch of the each of the machines A through D. The power supply of each of the machines A though D can be alternatively turned on/off in accordance with a signal supplied from a control device (described later).

At least one of the machines B through D is arranged to supply, to at least another machine, a stop signal causing the at least another machine to be stopped, in a case where the at least one of the machines B through D stops for some reason.

According to one or more embodiments of the present invention, the machine B, which is an injection molding machine, is arranged to supply a stop signal to the machine A provided at a previous stage of the machine B in the manufacturing line 10 (or to the machine A and the machine C which is provided at a subsequent stage of the machine B), in a case where the machine B stops for some reason. Note that, in a case where an amount of electric energy consumed by the machine B during the most recent given time period is equal to or less than a predetermined threshold, it is determined that the machine B has stopped.

<Configurations of Control Device and Peripheral Device Thereof>

The manufacturing line 10 includes a control device which controls the power supply of the machines A though D. The following description will discuss the control device in detail with reference to FIG. 2.

A control device 20 is an information processing device for controlling the power supply of the machines A though D of the manufacturing line 10. The control device 20 is connected to the machines A through D, an information system 60, a display device 40, and an input device 50. The control device 20 is further connected to wattmeters 11 through 14 provided in the manufacturing line 10.

The control device 20 is constituted by, for example, a PC (Personal Computer)-based computer. The control device 20 carries out a control process by causing the computer to execute a program. The control device 20 can be alternatively arranged to read the program stored in a removable medium (computer-readable recording medium) such as a CD-ROM (Compact Disc Read Only Memory) and use the program. Alternatively, the control device 20 can be arranged to read a program which is installed in, for example, a hard disk (a computer-readable recording medium) and use the program. Note that the control process which is carried out by the control device 20 will be described later in detail.

The information system 60 generates, in response to an input from an operator, schedule information indicative of an operation schedule of the manufacturing line 10, and supplies the schedule information to the control device 20. With reference to FIG. 3 illustrating an example of the schedule information, the information system 60 generates schedule information indicative of a scheduled stop time and a scheduled start-up time of the manufacturing line 10. The information system 60 can alternatively supply, in response to an input from the operator, an instruction to update schedule information to the control device 20.

The display device 40 is display means such as an LCD (Liquid Crystal Display), a PDP (Plasma Display), and an organic EL (electroluminescence). The display device 40 displays information, such as a character and an image, in accordance with display data received from the control device 20.

The input device 50 receives various inputs from an operator of the manufacturing line 10. The input device 50 is constituted by an input key, a pointing device such as a key board and a mouse, and other input devices. The input device 50 converts information inputted by the operator to input data, and transmits the input data to the control device 20.

Each of the wattmeters 11 through 14 is an integrating wattmeter measuring (informing) a total amount of electric energy consumed by a corresponding one of the machines A through D. Specifically, the wattmeter 11 measures a total amount of electric energy consumed by the machine A. The wattmeter 12 measures a total amount of electric energy consumed by the machine B. The wattmeter 13 measures a total amount of electric energy consumed by the machine C. The wattmeter 14 measures a total amount of electric energy consumed by the machine D. Note that a total amount of electric energy refers to a total amount of electric energy consumed from a point in time at which a machine is turned on to a point in time at which measurement is carried out (an integrated value of electric power consumed).

Figure 2:
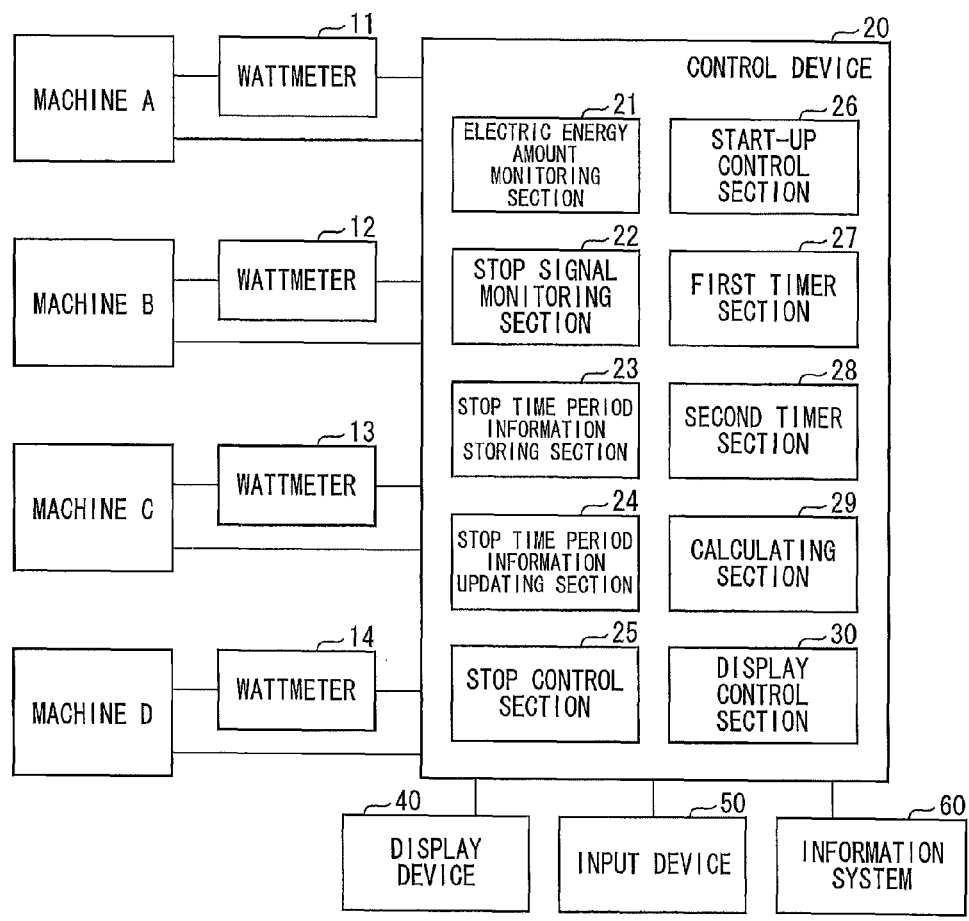
FIG. 2 is a block diagram schematically illustrating a configuration of a control device which controls a plurality of machines illustrated in FIG. 1.

Next, the following description will discuss, in detail, how the control device 20 carries out the control process. As illustrated in FIG. 2, the control device 20 includes an electric energy amount monitoring section 21, a stop signal monitoring section 22, a stop time period information updating section 24, a stop time period information storing section 23, a stop control section 25, a start-up control section 26, a first timer section 27, a second timer section 28, a calculation section 29, and a display control section 30. Note here that the stop control section 25 and the start-up control section 26 each function as an electric power control section.

The electric energy amount monitoring section 21 is a block which monitors, by accessing the wattmeters 11 through 14, amounts of electric energy consumed by the respective machines A through D. For example, the electric energy amount monitoring section 21 calculates an absolute value of a difference between (i) a value measured by the wattmeter 11 at a point in time at which measurement is started and (ii) a value measured by the wattmeter 11 at a point in time at which the measurement is finished. The electric energy amount monitoring section 21 monitors the absolute value as an amount of electric energy consumed from the point in time at which the measurement is started to the point in time at which the measurement is finished. It follows that the electric energy amount monitoring section 21 stores up histories of values measured by the wattmeters 11 through 14 over a past given time period. For example, in a case where an amount of electric energy is monitored which is consumed by the machine A during the most recent given time period (for example, one minute), the electric energy amount monitoring section 21 reads out, from a history of values measured by the wattmeter 11, a value measured at a point in time which is given time before a current point in time, as a value at a point in time at which measurement is started. The electric energy amount monitoring section 21 calculates an amount of electric energy, assuming that a value measured by the wattmeter 11 at the current point in time is a value at a point in time at which the measurement is finished. In a case where an amount of electric energy is monitored which is consumed by the machine B from a point in time at which the machine B is turned on to the current point in time, the electric energy amount monitoring section 21 reads out, from a history of values measured by the wattmeter 12, a value measured at the point in time at which the machine B is turned on, as a value at a point in time at which measurement is started. The electric energy amount monitoring section 21 calculates an amount of electric energy consumed by the machine B, assuming that a value measured by the wattmeter 12 at the current point in time is a value at a point in time at which the measurement is finished.

The stop signal monitoring section 22 is connected to a signal output terminal of each of the machines B through D. The stop signal monitoring section 22 monitors a stop signal which is outputted by any of the machines B through D and which causes the machine A to be stopped. In a case where the stop signal monitoring section 22 detects that a stop signal has been outputted, the stop signal monitoring section 22 controls the power supply of the machine A to be turned off and outputs, to the stop control section 25 and the start-up control section 26, stop signal receiving information including (i) information indicating that the stop signal has been received and (ii) stopping machine information indicative of which machine has outputted the stop signal.

The stop time period information updating section 24 updates stop time period information (schedule information) stored in the stop time period information storing section 23. Specifically, the stop time period information updating section 24 regularly accesses the information system 60 so as to obtain schedule information managed by the information system 60. The stop time period information updating section 24 generates stop time period information in accordance with the schedule information obtained. Note that the stop time period information updating section 24 can be arranged to, if the stop time period information updating section 24 receives an instruction to update schedule information from the information system 60, (i) receive schedule information from the information system 60 and (ii) generate stop time period information in accordance with the schedule information thus obtained. Alternatively, the stop time period information updating section 24 can be arranged to, according to an input operation conducted via the input device 50, newly generate stop time period information or generate stop time period information by editing existing stop time period information. The stop time period information updating section 24 stores the stop time period information thus generated in the stop time period information storing section 23 so as to update the stop time period information stored in the stop time period information storing section 23.

With reference to FIG. 4 illustrating an example of the stop time period information stored in the stop time period information storing section 23, the stop time period information storing section 23 stores stop time period information in which a scheduled start time of each scheduled stop time period is associated with a scheduled finish time of the each scheduled stop time period and a short-/long-period flag. Note here that the stop time period information is schedule information indicative of an operation schedule of the manufacturing line 10.

The stop time period information updating section 24 (i) extracts, from among scheduled start-up times later than each scheduled stop time indicated in the schedule information, a scheduled start-up time closest to the each scheduled stop time and (ii) generates stop time period information indicative of a scheduled stop time period whose scheduled start time is the each scheduled stop time and whose scheduled finish time is the scheduled start-up time thus detected. Further, the stop time period information updating section 24 calculates, for the stop time period information thus generated, a scheduled stop time period which is a difference between a scheduled start time and a scheduled finish time each indicated by the stop time period information thus generated. The stop time period information updating section 24 sets, to the scheduled stop time period, a long-/short-period flag indicative of "short period", in a case where the scheduled stop time period is equal to or less than a predetermined threshold (for example, two hours). In a case where the scheduled stop time period is more than the predetermined threshold, the stop time period information updating section 24 sets, to the scheduled stop time period, a long-/short-period flag indicative of "long period". The stop time period information updating section 24 stores, in the stop time period information storing section 23, the stop time period information in which the long-/short-period flag is set to the scheduled stop time period. With this, it is possible to understand whether a scheduled stop time period is a scheduled short stop time period or a scheduled long stop time period by checking a long-/short-period flag.

For example, the scheduled short stop time period is a lunch break or a time period during which an operator switches to another operator. On the other hand, the scheduled long stop time period is a time period of non-operation day such as a holiday and a summer vacation.

The stop control section 25 controls the power supply of the machines B through D to be turned off, in accordance with at least (i) an amount of electric energy consumed by the machine A and (ii) stop time period information stored in the stop time period information storing section 23.

The stop control section 25 controls the power supply of at least one of the machines B through D to be turned off, in a case where any of the following conditions A through D is satisfied.

Condition A: (i) a first amount of electric energy, which is an amount of electric energy consumed by the machine A during the most recent given time period (for example, a time period from 30 seconds before to a current point in time), is equal to or less than a predetermined threshold "a" and (ii) the current point in time is included, according to the stop time period information, in a scheduled stop time period which is flagged with "long period".

Condition B: (i) the first amount of electric energy, which is an amount of electric energy consumed by the machine A during the most recent given time period (for example, a time period from 30 seconds before to a current point in time), is equal to or less than the predetermined threshold "a" and (ii) the current point in time is included, according to the stop time period information, in a scheduled stop time period which is flagged with "short period".

Condition C: (i) the first amount of electric energy, which is an amount of electric energy consumed by the machine A during the most recent given time period (for example, a time period from 30 seconds before to a current point in time), is equal to or less than the predetermined threshold "a", (ii) the current point in time is not included in any of scheduled stop time periods (that is, the current point in time is included in a scheduled operation time period), and (iii) the stop control section 25 has received stop signal receiving information from the stop signal monitoring section 22 during the most recent given time period (for example, a time period from 3 minutes before to the current point in time).

Condition D: (i) a state has lasted for a given time period or more (for example, 1(one) minute) in which state the first amount of electric energy, which is an amount of electric energy consumed by the machine A during the most recent given time period (for example, a time period from 30 seconds before to a current point in time), is equal to or less than the predetermined threshold "a", (ii) the current point in time is not included in any of scheduled stop time periods (that is, the current point in time is included in a scheduled operation time period), and (iii) the stop control section 25 has received no stop signal receiving information from the stop signal monitoring section 22 during the most recent given time period (for example, a time period from 3 minutes before to the current point in time).

Note that, in a case where the condition B is satisfied, the stop control section 25 controls only the power supply of the machine C to be turned off, and controls the power supply of the machines B and D not to be turned off. On the other hand, in a case where the conditions A, C, and D are satisfied, the stop control section 25 controls the power supply of the machines B through D to be turned off.

In a case where the condition B is satisfied, the stop control section 25 causes the first timer section 27 to reset and thereafter start counting.

In a case where (i) any of the conditions A through D is satisfied and (ii) the stop control section 25 controls the power supply of at least one of the machines B through D to be turned off, the stop control section 25 supplies, to the start-up control section 26, stop information indicative of the any of the conditions A though D.

The start-up control section 26 controls a machine to be started up which machine has been stopped by the stop control section 25. The start-up control section 26 starts up the machines A through D in accordance with stop information received from the stop control section 25.

In a case where the stop information indicates the condition A, the start-up control section 26 starts up the machines A through D in response to an instruction to start up the manufacturing line 10 which instruction is inputted via the input device 50. Specifically, in a case where a start-up instruction is inputted, the start-up control section 26 first controls the power supply of the machine B, which is an injection molding machine and which requires time to be started up (booted up), to be turned on. Thereafter, the start-up control section 26 obtains, from the electric energy amount monitoring section 21, information regarding a second amount of electric energy, which is an amount of electric energy consumed by the machine B after the power supply of the machine B is tuned on. The start-up control section 26 controls the power supply of the machines A, C, and D to be turned on, in a case where the second amount of electric energy reaches a predetermined threshold "b". Such a method of controlling power supply of a machine is disclosed in Patent Literature 2.

In a case where the stop information indicates the condition B, the start-up control section 26 sets start-up starting time. In a case where time counted by the first timer section 27 reaches the start-up starting time, the start-up control section 26 controls the power supply of the machine C to be turned on.

In a case where the stop information indicates the condition C, the start-up control section 26 obtains information regarding a third amount of electric energy, which is an amount of electric energy consumed during the most recent given time period by a machine that is indicated by the stop signal receiving information received from the stop signal monitoring section 22. In a case where the third amount of electric energy thus obtained is equal to or more than a predetermined threshold "c", the start-up control section 26 determines that the machine, which has outputted a stop signal, has normally started operating, and thereafter controls power supply of machines other than the machine, which has outputted the stop signal, to be turned on.

In a case where the stop information indicates the condition D, the start-up control section 26 starts up the machines A through D in response to an instruction to start up the manufacturing line 10 which instruction is inputted via the input device 50, as with the case of the condition A.

The first timer section 27 and the second timer section 28 each function as a timer. Upon receipt of an instruction to reset and start counting from the stop control section 25, the first timer section 27 and the second timer section 28 each operate in accordance with the instruction.

The calculation section 29 obtains, from the electric energy amount monitoring section 21, information regarding amounts of electric energy consumed by the respective machines A through D during each given time period (for example, 10 minutes), and calculates a sum of the amounts of electric energy. The display control section 30 controls the display section 40 to display the sum calculated by the calculation section 29. This allows an operator (worker) to easily manage an amount of electric energy consumed by the whole line.

<Process Carried Out by Stop Control Section>

Figure 5:
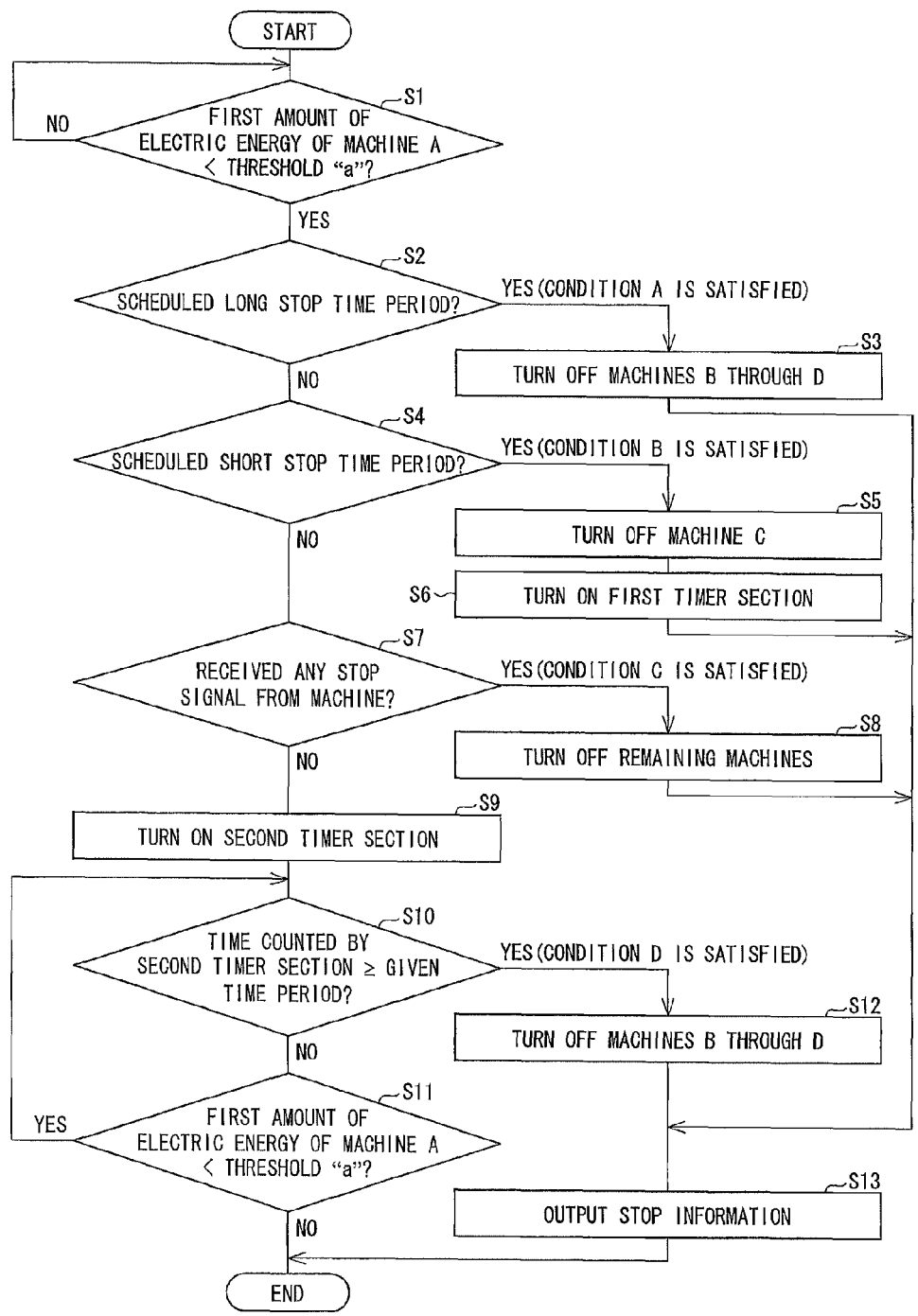
FIG. 5 is a flowchart illustrating how a stop control section of the control device carries out a process.

Next, the following description will discuss, with reference to a flowchart illustrated in FIG. 5, how the stop control section 25 carries out a process.

The stop control section 25 obtains, from the electric energy amount monitoring section 21, a first amount of electric energy, which is an amount of electric energy consumed by the machine A during the most recent given time period (for example, 30 minutes), and compares the first amount of electric energy with a predetermined threshold "a" (step S1). Note here that the predetermined threshold "a" is set to an amount smaller than a minimum amount of electric energy consumed during a given time period by the machine A in normal operation. Therefore, by comparing the first amount of electric energy with the predetermined threshold "a", the stop control section 25 is capable of determining whether or not the machine A is stopped. Further, by monitoring the machine A located at a head of the manufacturing line 10, it is possible to flexibly control a machine to be stopped in accordance with an operating status of the manufacturing line 10.

In a case where the first amount of electric energy is smaller than the threshold value "a" (Yes, in the step S1), the stop control section 25 determines whether or not a current point in time is included in a scheduled long stop time period, by checking the stop time period information stored in the stop time period information storing section 23 (step S2).

In a case where the current point in time is included in a scheduled long stop time period (Yes, in the step S2), the stop control section 25 determines that the condition A is satisfied. In this case, the stop control section 25 determines that the machine A has been stopped due to the scheduled long stop time period, and controls the power supply of the machines B through D to be turned off (step S3). Thus, even in a case where it is forgotten to turn off the power supply of the machines B through D during the scheduled long stop period, it is possible to prevent wasteful electric power consumption because the stop control section 25 controls the power supply of the machines B through D to be turned off. Thereafter, the stop control section 25 supplies stop information indicative of the condition A to the start-up control section 26 (step S13).

Note that, by calculating a difference between a scheduled start time of a scheduled stop time period and a current point in time, the stop control section 25 is capable of recognizing that a progress is behind the scheduled start time by the difference.

On the other hand, in a case where the current point in time is not included in a scheduled long stop time period (No, in the step S2), the stop control section 25 determines whether or not the current point in time is included in a scheduled short stop time period by checking the stop time period information (step S4).

In a case where the current point in time is included in a scheduled short stop time period (Yes, in the step S4), the stop control section 25 determines that the condition B is satisfied. In this case, the stop control section 25 determines that the machine A has been stopped due to the scheduled short stop time period, and controls only the power supply of machine C to be turned off (step S5). The scheduled short stop time period indicates a short time period, such as a lunch break and a time period during which an operator switches to another operator, during which the manufacturing line 10 is stopped. In a case where the machine B, which is an injection molding machine and which requires time to be started up (booted up), is stopped during such a short time period, the manufacturing line 10 fails to operate after the end of the scheduled short stop time period because it takes time to restart the machine B. Further, it follows that unnecessary electric power is consumed so as to start up the machine B. For this reason, only the power supply of the machine C, which is an inspection machine and which does not require time to be started up, is turned off, while the power supply of the machines B and the machine D, which is attached to the machine B, is tuned on.

After that, the stop control section 25 causes the first timer section 27 to reset and thereafter start counting (step S6). With this, it is possible to recognize time that has elapsed after the machine C is stopped, by checking time counted by the first timer section 27. Next, the stop control section 25 supplies, to the start-up control section 26, stop information indicative of (i) the condition B and (ii) a first timer start time, which is a time at which the stop control section 25 has caused the first timer section 27 to start counting (step S13).

Note that, by calculating a difference between a scheduled start time of a scheduled stop time period and a current point in time, the stop control section 25 is capable of recognizing that a progress is behind the scheduled start time by the difference.

On the other hand, in a case where the current point in time is not included in a scheduled short stop time period (No, in the step S4), the stop control section 25 determines whether or not to have received stop signal receiving information from the stop signal monitoring section 22 within the most recent given time period (for example, three minutes) (step S7).

In a case where the stop control section 25 has received the stop signal receiving information (Yes, in the step S7), the stop control section 25 determines that the condition C is satisfied. In this case, the stop control section 25 determines that the stop signal monitoring section 22 has stopped the machine A in response to a stop signal outputted by any of the machines B through D, and controls the power supply of the remaining machines to be tuned off (step S8). Thereafter, the stop control section 25 supplies stop information indicative of the condition C to the start-up control section 26 (step S13). Note that, in a case where the stop signal has been supplied to a plurality of machines including the machine A, the plurality of machines have been already stopped in response to the stop signal. In this case, the stop control section 25 identifies, with reference to an amount of electric energy, a machine whose power supply is turned on, and controls only the power supply of the machine thus identified to be turned off.

In a case where the stop control section 25 has not received the stop signal receiving information (No, in the step S7), the stop control section 25 causes the second timer section 28 to reset and thereafter start counting (step S9).

Thereafter, the stop control section 25 determines whether or not time counted by the second timer section 28 reaches a given time period (for example, 1(one) minute or 10 minutes) or more (step S10). In a case where the time counted by the second timer section 28 is less than the given time period (No, in the step S10), the stop control section 25 carries out a step S11 which is a step similar to the step S1. Then, in a case where the first amount of electric energy is equal to or more than the predetermined threshold "a" (No, in the step S11), the stop control section 25 ends the process. In a case where the first amount of electric energy is less than the predetermined threshold "a" (Yes, in the step S11), the stop control section 25 returns to the step S10. By repeating the steps S10 and S11, it is possible to determine whether or not a state in which the first amount of electric energy is less than the predetermined threshold "a" (that is, a state in which the machine A is stopped) has lasted for the given time period or more.

In a case of Yes in the step S10 (that is, in a case where the state in which the machine A is stopped has lasted for the given time period or more), the stop control section 25 determines that the condition D is satisfied. This indicates that the machine A has been stopped for a long time although the manufacturing line 10 is not in the scheduled stop time period. In this case, it is highly possible that the machine A has been stopped due to some trouble or maintenance. In this state, a workpiece is not supplied from the machine A to the machines B and C provided at the subsequent stage of the machine A. It follows that the machines B and C consume wasteful electric power. In view of the circumstances, in a case where the condition D is satisfied, the stop control section 25 determines that the machine A has been stopped due to some trouble or the like, and then controls the power supply of machines B through D to be turned off (step S12). Note that, in the step S12, a stop signal indicating that the machine A is stopped can be supplied to the machines B through D. Thereafter, the stop control section 25 supplies stop information indicative of the condition D to the start-up control section 26 (step S13).

<Process Carried Out by Start Control Section>

Figure 6:
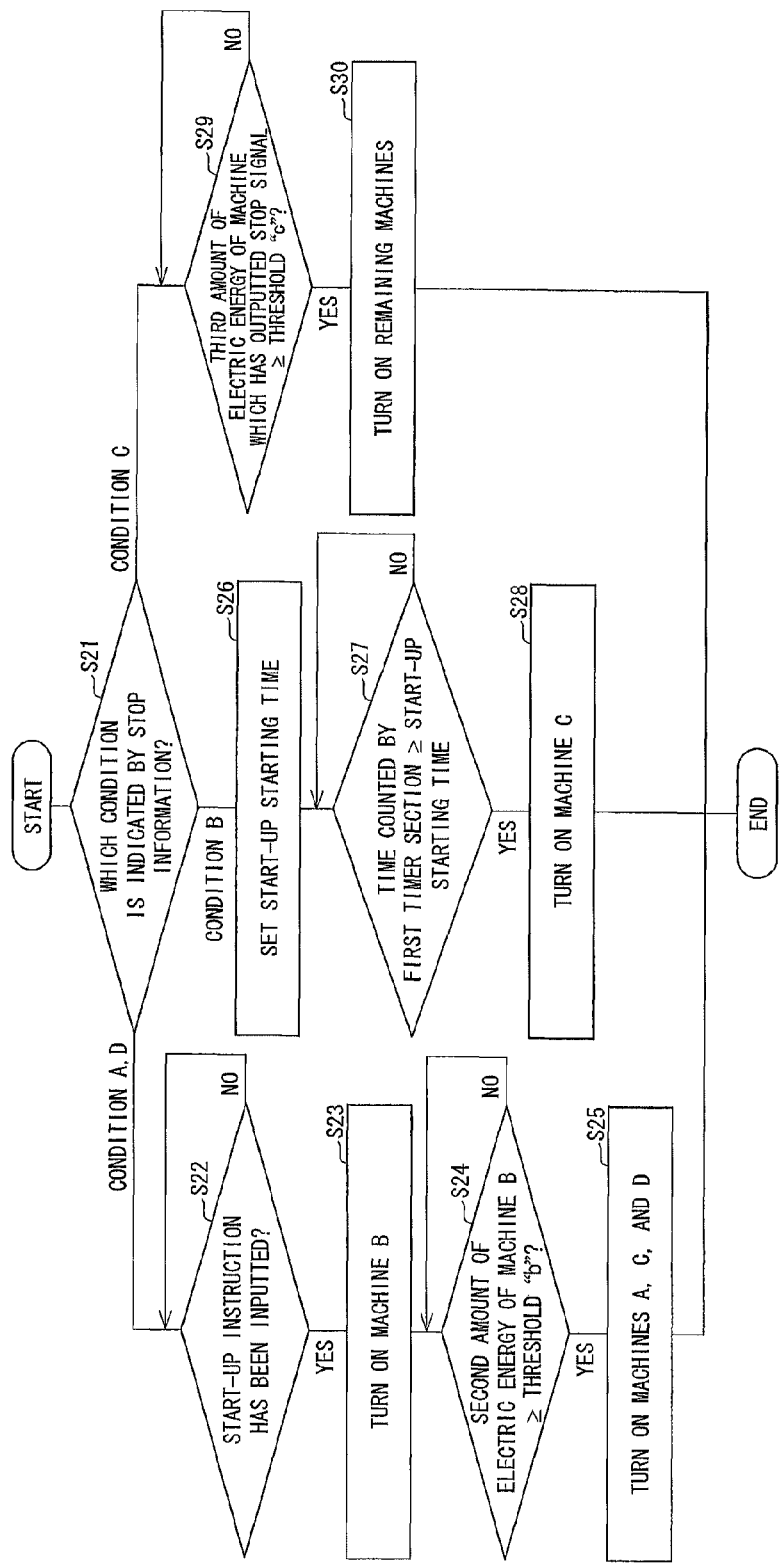
FIG. 6 is a flowchart illustrating how a start-up control section of the control device carries out a process.
Figure 7:
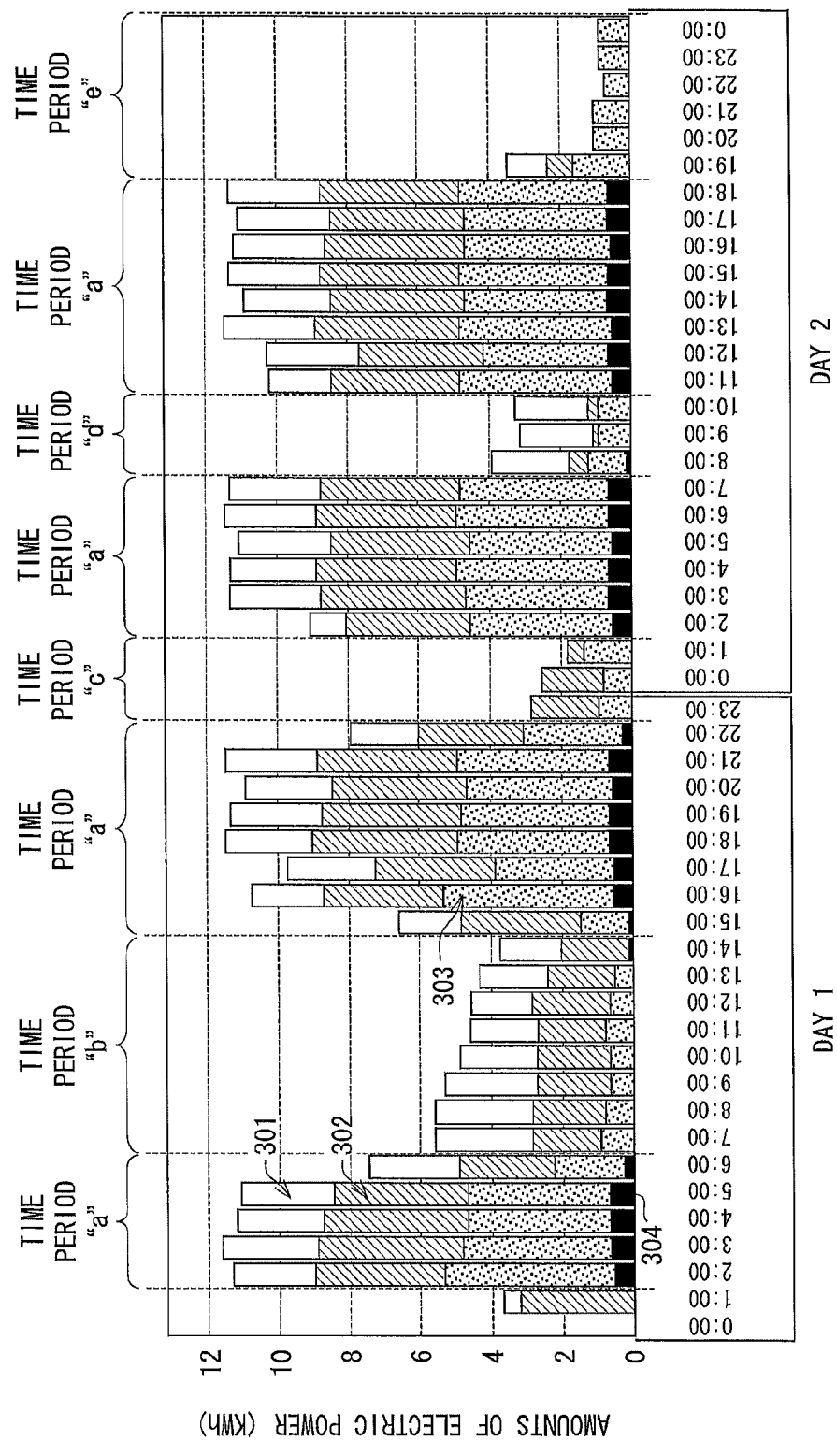
FIG. 7 is a graph illustrating electric power used by each of machines A through D (electric power consumption).

Next, the following description will discuss, with reference to a flowchart illustrated in FIG. 6, how the start control section 26 carries out a process.

As has been described, in a case where any of the conditions A through D is satisfied, the stop control section 25 controls power supply of at least one of the machines B through D to be turned off, and supplies, to start-up control section 26, stop information indicative of the any of the conditions A through D (the step S13 illustrated in FIG. 5).

The start-up control section 26 first checks a condition indicated by the stop information received from the stop control section 25 (step S21), and then carries out a process in accordance with the condition.

In a case where the stop information indicates the condition A or D, the start-up control section 26 determines whether or not a start-up instruction has been inputted via the input device 50 (step S22). The condition A indicates a case where the manufacturing line 10 has been stopped due to a scheduled long stop time period (for example, non-operation day such as Saturday and Sunday, and a summer vacation). In this case, an operator inputs a start-up instruction on a day after the non-operation day. The condition D indicates a case where, although the manufacturing line 10 is not in a scheduled stop time period, the machine A has been stopped for a long time period due to some trouble or the like. In this case, the operator inputs a start-up instruction after the operator overcomes the trouble or the like.

In a case where a start-up instruction is inputted via the input device 50 (Yes, in the step S22), the start-up control section 26 controls the power supply of the machine B, which is an injection machine and which requires time most to be started up (booted up), to be turned on (step S23).

Thereafter, the start-up control section 26 obtains, from the electric energy amount monitoring section 21, information regarding a second amount of electric energy, which is an amount of electric energy consumed by the machine B during a measurement period in which (i) a point in time at which the power supply of the machine B is turned on serves as a point in time at which measurement is started and (ii) a current point in time serves as a point in time at which the measurement is finished. The start-up control section 26 then determines whether or not the second amount of electric energy is equal to or more than the predetermined threshold "b" (S24). Note here that the threshold "b" is an amount from which it is assumed that a process carried out by the machine B progresses to a state in which the power supply of the machines A, C, and D can be turned on. The threshold "b" is empirically set in accordance with specs of each machine, a content of design of the manufacturing line 10, a type of a workpiece, or the like. Note that the threshold "b" can be set after a test operation is conducted.

In a case where the second amount of electric energy is less than the predetermined threshold "b" (No, in the step S24), the start-up control section 26 again obtains information regarding the second amount of electric energy and then carries out the step S24.

In a case where the second amount of electric energy is equal to or more than the predetermined threshold "b" (Yes, in the step S24), the start-up control section 26 controls the power supply of the machines A, C, and D to be turned on (step S25). In this manner, the start-up control section 26 first controls the power supply of the machine B to be turned on, and then control the power supply of the other machines to be turned on in a case where an amount of electric energy consumed by the machine B reaches the predetermined threshold "b". This allows a reduction in wasteful standby electric power which is consumed by the machines A, C, and D by a time when a start-up of the machine B is completed, as compared with a case where the power supply of each of the machines A through D is concurrently turned on. Note that, as such a method, the technique disclosed in Patent Literature 2 can be employed.

In this way, the start-up control section 26 is capable of starting up all of the machines included in the manufacturing line 10.

In a case where the stop information indicates the condition B, the start-up control section 26 sets a time period in which the machine C is started up (start-up starting time) (step S26). Specifically, the start-up control section 26 calculates a time difference between (i) a first timer start time included in the stop information received from the stop control section 25 and (ii) a scheduled start time of a scheduled short stop time period in which the current point in time is included according to the stop time period information. The start-up control section 26 then sets, as the start-up starting time, time obtained by subtracting the time difference from the scheduled short stop time period.

Thereafter, the start-up control section 26 determines whether or not time, counted by the first timer section 27 which has been caused to start counting in the step S6 illustrated in FIG. 5, reaches the start-up starting time set in the step S26 (step S27). In a case where the time counted does not reach the start-up starting time, the start-up control section 26 repeats the step S27 until the time counted reaches the start-up starting time.

In a case where the time, counted by the first timer section 27, reaches the start-up starting time (Yes, in the step S27), the start-up control section 26 controls the power supply of the machine C to be turned on (step S28).

Note here that the first timer section 27 starts counting at a timing when the machine C is stopped, during the scheduled short stop time period. The start-up starting time is set to time which is obtained by subtracting the time difference from the scheduled short stop time period. It follows that a timing at which the time counted by the first timer section 27 reaches the start-up starting time is equal to a scheduled finish time of the scheduled short stop time period. Therefore, it is possible to automatically turn on the power supply of the machine C at a timing when the scheduled short stop time period finishes. The scheduled short stop time period is a lunch break or a time period during which an operator switches to another operator. During the scheduled short stop time period, the machines B and D, each of which requires time to be started up, are in warm-up operation, while the machine C, which does not require time to be started up, is stopped. Thus, some of the machines are in warm-up operation, while the other is stopped. The operator may forget to start up the machine which is stopped. However, according to one or more embodiments of the present invention, it is possible to prevent the operator from forgetting to start up the machine because the machine which is stopped is automatically started up.

In a case where the stop information indicates the condition C, the start-up control section 26 obtains, from the electric energy amount monitoring section 21, information regarding a third amount of electric energy, which is an amount of electric energy consumed during the most recent given time period by a machine that is indicated by a stop signal receiving information received from the stop signal monitoring section 22. The start-up control section 26 then determines whether or not the third amount of electric energy thus obtained is equal to or more than the predetermined threshold "c" (step S29). Note here that the threshold "c" is set, individually for each machine, to an amount slightly smaller than an amount of electric energy consumed during a given time period by the each machine in normal operation. Therefore, the third amount of electric energy being equal to or more than the predetermined threshold "c" means that the machine is in normal operation.

In a case where the third amount of electric energy is not equal to or not more than the predetermined threshold "c" (No, in the step S29), the start-up control section 26 determines that the machine has not been in normal operation yet (that is, no trouble with the machine has been solved yet), and then again obtains information regarding the third amount of electric energy from electric energy amount monitoring section 21 and carries out the step S29.

In a case where the operator (i) solves the trouble with the machine, which has outputted a stop signal, and then (ii) manually turns on the power supply of the machine, the machine normally starts operating and, accordingly, consumes a more amount of electric energy. As a result, the third amount of electric energy becomes equal to or more than the threshold "c".

In a case where the third amount of electric energy is equal to or more than the predetermined threshold "c" (Yes, in the step S29), the start-up control section 26 determines that the trouble with the machine B, which has outputted the stop signal, is solved and the machine B is in normal operation, and thereafter controls the power supply of the machines A, C, and D to be turned on (step S30). In this way, the start-up control section 26 is capable of starting up all of the machines included in the manufacturing line 10.

Modified Example 1

The above description has discussed a case where, in a case where stop information indicates the condition A, the start-up control section 26 carries out the steps S23 through S25 when it is determined, in the step S22, that a start-up instruction has been inputted. However, it can be alternatively arranged such that, in a case where the condition A is satisfied, the start-up control section 26 starts the step S23 at a scheduled finish time of a scheduled stop time period (scheduled start-up time) or given time before the scheduled finish time. With this arrangement, the manufacturing line 10 is automatically started up after the end of the scheduled stop time period.

It may be arranged such that, in a case where there is a machine which requires time to be started up (booted up) like the machine B, the start-up control section 26 (i) stores, in advance, average time which the machine normally requires to be started up and (ii) starts the step S23 at a timing preceding, by the average time, a scheduled finish time of a scheduled stop time period (scheduled start-up time). With this arrangement, since the machine B has been started up at the scheduled finish time, it is possible to start up the manufacturing line 10 early.

Modified Example 2

The above description has discussed a case where, in the step S26, the start-up control section 26 (i) calculates a time difference between a first timer start time and a scheduled start time of a scheduled short stop time period in which a current point in time is included, and (ii) sets, as start-up starting time, time obtained by subtracting the time difference from the scheduled short stop time period. However, how to set the start-up starting time is not limited to this. For example, it may be arranged such that, in a case where a machine to be started up requires a certain amount of time to be started up (booted up), the start-up control section 26 sets start-up starting time in consideration of the certain amount of time. Specifically, assuming that a machine to be started up requires 15 minutes to be started up, the start-up control section 26 is only necessary to (i) calculate a time difference between a first timer start time and a scheduled start time of a scheduled stop time period and (ii) set, as start-up starting time, time obtained by subtracting 15 minutes and the time difference from the scheduled stop time period. With this arrangement, it is possible to complete a start-up at a scheduled finish time of a scheduled stop time period.

Modified Example 3

The above description discussed a case where, in a case where the condition B is satisfied, the stop control section 25 controls only the power supply of the machine C to be turned off. However, it may be arranged such that, in a case where a scheduled stop time period is relatively long (for example, three hours) and time required to start up (boot up) the machine B is shorter than the scheduled stop time period, the stop control section 25 controls the power supply of each of the machines B through D to be turned off in the step S5.

In this case, the start-up control section 26 can be arranged to carry out the steps S23 through S25 instead of the step S28.

Further, the start-up control section 26 can be arranged to set, in the step S26, start-up starting time as below.

According to the machine B, which is an injection molding machine, it is necessary to increase a temperature of a specific heating part of the machine B until the temperature of the heating part of the machine B reaches a set temperature. Accordingly, the machine B requires time to be started up (booted up). The machine B having such a configuration has some degree of residual heat, even after the machine B is stopped. In a case where the machine B is started up (booted up) in a state where the machine B has residual heat, time required to start up the machine B varies depending on the residual heat. That is, in a case where the temperature of the heating part is closer to the set temperature, the time required to start up the machine B is shorter. In a case where the temperature of the heating part is closer to a room temperature, the time required to start up the machine B is longer.

In view of the circumstances, the start-up control section 26 is arranged as follows. That is, an operator obtains first temperature information in advance by conducting an experiment, the first temperature information being indicative of a correspondence between (i) a measured temperature of the heating part of the machine B and (ii) time elapsed after the power supply of the machine B is turned off in a state where a temperature of the heating part is equal to the set temperature. Further, the operator obtains second temperature information in advance by conducting an experiment, the second temperature information being indicative of a correspondence between (i) a measured temperature of the heating part and (ii) time elapsed after the power supply of the machine B is turned on in a state where a temperature of the heating part is equal to a room temperature. The start-up control section 26 stores the first temperature information and the second temperature information. Note that time elapsed, according to the first temperature information, before a measured temperature becomes equal to the room temperature is referred to as time T1 and time elapsed, according to the second temperature information, before a measured temperature becomes equal to the set temperature is referred to as time T2.

Furthermore, the start-up control section 26 generates third temperature information in accordance with the first temperature information and the second temperature information and causes the third temperature information to be stored. Note here that the third temperature information is indicative of a correspondence between (i) a temperature Tx and (ii) time between a point in time at which the power supply of the machine B is turned off and a point in time at which the temperature of the heating part of the machine B again reaches the set temperature, where the temperature Tx is such a temperature that, when the temperature of the heating part is equal to the temperature Tx, the power supply of the machine B is turned on again after the power supply of the machine B is turned off at a point in time at which the temperature of the heating part is equal to the set temperature. That is, in regard to any selected temperature Tx, the start-up control section 26 extracts, from the first temperature information, time T3 elapsed before a measured temperature becomes equal to the any selected temperature Tx, and calculates, with reference to the second temperature information, time T4 elapsed before the measured temperature becomes equal to the set temperature from the any temperature Tx. The start-up control section 26 associates the temperature Tx with time (T3+T4), thereby generating the third temperature information. Note that the start-up control section 26 generates the third temperature information in regard to each of a plurality of temperatures between the room temperature and the set temperature, while changing the temperature Tx at a predetermined interval (for example, 1(one)° C.).

The start-up control section 26 calculates a time difference between (i) a first timer start time included in stop information received from the stop control section 25 and (ii) a scheduled finish time of a scheduled short stop time period in which a current point in time is included according to stop time period information. In a case where the time difference is equal to or more than time (T1+T2), the start-up control section 26 is only necessary to set, as start-up starting time, time obtained by subtracting the time T2 from the time difference. This is a case where, by the scheduled finish time of the scheduled short stop time period, there is enough time so that the heating part of the machine B is cooled down to the room temperature, then the machine B is started up, and a temperature of the heating part of the machine B becomes equal to the set temperature. By thus setting, as the start-up starting time, time obtained by subtracting the time T2 from the time difference, the machine B is started up at a timing preceding, by the time T2, the scheduled finish time, and then the temperature of the heating part of the machine B reaches the set temperature at the scheduled finish time.

In a case where the time difference is less than the time (T1+T2), this means that waiting for the heating part of the machine B to be cooled down to the room temperature would result in that it is not possible to cause the temperature of the heating part of the machine B to be equal to the set temperature at the scheduled finish time of the scheduled short stop time period. In this case, in order to cause the temperature of the heating part of the machine B to be equal to the set temperature at the scheduled finish time, it is necessary to start up the machine B in a state where the machine B has some degree of residual heat. In view of the circumstances, the start-up control section 26 sets the start-up starting time as below. That is, the start-up control section 26 obtains, with reference to the third temperature information, a temperature corresponding to the time difference between the first timer start time and the scheduled finish time. The start-up control section 26 then obtains, with reference to the first temperature information, elapsed time corresponding to the temperature thus obtained, and sets, as the start-up starting time, the elapsed time thus obtained. It follows that the machine B is started up in a case where the temperature of the heating part of the machine B is equal to the temperature obtained with reference to the third temperature information and that the temperature of the heating part of the machine B reaches the set temperature at the scheduled finish time of the scheduled short stop time period.

Modified Example 4

The above description has discussed a case where, in the steps S3, S5, S8, and S12 illustrated in FIG. 5, the stop control section 25 controls power supply of at least one of the machines B through D to be turned off. However, it may be arranged such that, in a case where each of the machines B through D has (i) a normal operation mode in which the each of the machines B through D carries out a predetermined process with respect to a workpiece (normal operation) and (ii) an electric power saving mode in which the each of the machines B through D consumes less electric power than in the normal operation mode and does not carry out the predetermined process with respect to the workpiece, the stop control section 25 controls the machines B through D to be in the electric power saving mode, instead of controlling the power supply of the machines B through D to be turned off. Note that, in the electric power saving mode, electric power saving is attempted by reducing electricity supplied to part of a member constituting a machine, as compared with that in the normal operation mode.

Modified Example 5

The above description has discussed a case where, in a case where the condition C is satisfied, the stop control section 25 controls power supply of at least one of the machines B through D to be turned off. However, according to the condition C, it is assumed that a stop signal, for causing the machine A to be stopped, is outputted from at least one of the machines B through D. Therefore, in a case where there is no such a machine that outputs a stop signal, the steps S7 and S8 illustrated in FIG. 5 can be omitted. In this case, the condition D is as follow.

Condition D: (i) a state has lasted for a given time period or more (for example, 1(one) minute) in which state the first amount of electric energy, which is an amount of electric energy consumed by the machine A during the most recent given time period (for example, a time period from 30 seconds before to a current point in time), is equal to or less than the predetermined threshold "a", and (ii) the current point in time is not included in any of scheduled stop time periods (that is, the current point in time is included in a scheduled operation time period).

Modified Example 6

The above description has discussed a case where, in a case where stop information indicates the condition A or D, the power supply of the machine B is first turned on and then the power supply of the machines A, C, and D are turned on at a timing when the second amount of electric energy of the machine B is equal to or more than the predetermined threshold "b" (see the steps S23 through S25). However, the start-up control section 26 can be arranged to (i) determine whether or not time that has elapsed from a point in time at which the step S23, instead of the step S24, is carried out reaches a given time period and (ii) carry out the step S25 in a case where the time period reaches the given time period. In this case, the given time period is determined in advance by an operator after a test operation is carried out. With this arrangement, it is possible to first start up the machine B, which requires time to be started up.

<Others>

The above description has discussed a case where a threshold process is carried out. According to such a threshold process that determines whether or not a value to be determined is equal to or more than a threshold, it can be determined whether or not "the value to be determined≥the threshold" or whether or not "the value to be determined>the threshold". Similarly, in a case of such a threshold process that determines whether or not a value to be determined is equal to or less than a threshold, it can be determined whether or not "the value to be determined≤the threshold" or whether or not "the value to be determined<the threshold".

Further, the above description has discussed a case where the stop time period information storing section 23 stores stop time period information indicative of a scheduled stop time period. However, the stop time period information storing section 23 can be arranged to store stop time period information indicative of a scheduled operation time period, instead of a scheduled stop time period. Since a time period obtained by excluding the scheduled operation time period from the entire time period is a scheduled stop time period, it is possible to easily recognize the scheduled stop time period even in a case of the stop time period information indicative of a scheduled operation time period. That is, it is only necessary that the stop time period information storing section 23 store stop time period information serving as schedule information indicative of an operation schedule of the manufacturing line 10 and that each scheduled stop time period obtained from the schedule be associated with a long-/short-period flag depending on a length of the each scheduled stop time period.

Note that the above embodiments have discussed a manufacturing line as an example. However, the scope of the present invention is not limited to the manufacturing line. One or more embodiments of the present invention is also applicable to an inspection line, a package classification line in a distribution center, and the like.

In the specification, a line refers to a system which carries out a process, such as processing, assembly, and inspection, with respect to a workpiece, and the line is not limited to such a line that a plurality of machines are arranged in a straight line. For example, the line of one or more embodiments of the present invention can be such a line that an entire process is carried out by a machine provided on the first floor of a building and a machine provided on the second floor of the building. Alternatively, the line of one or more embodiments of the present invention can be such a line that an entire process is carried out by all of a plurality of machines spread over a plurality of buildings. Further, the present invention is not limited to the line. One or more embodiments of the present invention can be applied to a system in which a plurality of machines operate in association with each other. According to such a system, in order to suppress wasteful electric power consumption, it is possible to control, at an appropriate timing, power supply of a machine which operates in association with the other machines.

For example, one or more embodiments of the present invention can be applied to a system which controls a plurality of elevators in a building. The following description will discuss, as an example, a system which controls eight elevators A through H. In this case, a stop time period information storing section of a control device stores a scheduled stop time period "from 22 o'clock to 5 o'clock" and a flag "night-time" in association, and stores a scheduled stop time period "Sunday" and a flag "Sunday" in association. An electric energy amount monitoring section of the control device monitors an amount of electric energy consumed by the elevator A during the most recent given time period (for example, 30 minutes).

A stop control section obtains, from the electric energy amount monitoring section, information regarding a first amount of electric energy, which is an amount of electric energy consumed by the elevator A during the most recent given time period, and compares the first amount of electric energy with a predetermined threshold "a". In a case where the first amount of electric energy is smaller than the predetermined threshold "a", the stop control section determines whether a current point in time is included in the scheduled stop time period flagged with "night-time" or the scheduled stop time period "Sunday" by checking stop time period information stored in the stop time period information storing section. In a case where the current point in time is included in the scheduled stop time period flagged with "night-time", the stop control section 25 determines that a use frequency is extremely low due to nigh-time, and controls power supply of the elevators D through H to be turned off. By thus controlling the power supply of the elevators D through H to be turned off during the scheduled stop time period at night-time during which the use frequency of the elevators is extremely low, it is possible to prevent wasteful electric power consumption.

On the other hand, in a case where the current point in time is not included in the scheduled stop time period flagged with "night-time", the stop control section determines whether or not the current point in time is included in the scheduled stop time period "Sunday" by checking the stop time period information. In a case where the current point in time is included in the scheduled stop time period "Sunday", the stop control section determines that the use frequency is slightly low due to Sunday, and controls the power supply of the electors F through H to be turned off. By thus controlling the power supply of the elevators F through H to be turned off during the scheduled stop time period on Sunday during which the use frequency of the elevators is a little low, it is possible to prevent wasteful electric power consumption.

Note that, even at night-time or on Sunday, there is a case where the elevators are frequently used due to a special matter. In this case, because the first amount of electric energy is equal to or more than the predetermined threshold "a", the stop control section controls the power supply of the elevators D through H or the power supply of the elevators F through H not to be turned off even at night-time or on Sunday. Therefore, even at special nigh-time or on special Sunday when the elevators are frequently used, it is possible to use all of the elevators. Thus, in accordance with (i) an amount of electric energy consumed by any one of the elevators and (ii) a scheduled stop time period indicative of an operation schedule of each of the elevators, the stop control section controls the power supply of the other of the elevators. It is therefore possible to control the power supply of the elevators depending on an actual usage situation of the elevators during the scheduled stop time period.

One or more embodiments of the present invention can be further applied to a system for controlling a treatment process carried out on an object. Note that examples of the treatment process include: an inspection process carried out on an industrial product, an agricultural product, or a raw material; a treatment process carried out on a waste (for example, an industrial waste, industrial waste water, waste gas, or trash); an inspection process carried out on a waste; an inspection process carried out on a machine; and a recycling process.

For example, one or more embodiments of the present invention can be applied to a drainage system in which a plurality of drainage machines process industrial waste water. Also in this case, a schedule of the plurality of drainage machines is set in advance because an amount of the industrial waste water is estimated in advance for each time period. That is, a time period during which the amount of the industrial waste water is expected to be small is scheduled in advance as a time period during which some of the plurality of drainage machines can be stopped. Note, however, that the industrial waste water is not always produced on schedule and may increase in amount for some reason during the time period during which the amount of the industrial waste water is expected be small. Even in this case, in accordance with (i) an amount of electric energy consumed by any one of the plurality of drainage machine and (ii) the operation schedule of each of the plurality of drainage machines, the other of the plurality of drainage machines are controlled. Therefore, even during the time period during which the amount of the industrial waste water is expected to be small, it is possible to control power supply of the plurality of drainage machines depending on an actual amount of the industrial waste water during the time period.

As has been described, a control device according to one or more embodiments of the present invention includes: a monitoring section for monitoring an amount of electric energy of a first machine; and a power supply control section for controlling power supply of a second machine in accordance with (i) the amount of electric energy of the first machine and (ii) schedule information indicative of an operation schedule of each of the first machine and the second machine.

According to the above configuration, the power supply of the second machine is controlled in accordance with the amount of electric energy of the first machine and the schedule information. The amount of electric energy of the first machine varies depending on an operating status of the first machine. Therefore, it is possible to control the power supply of the second machine at an appropriate timing in consideration of both an actual operating status and the operation schedule of the first machine. As a result, it is possible to stop the second machine, for example, at a timing at which the first machine is stopped, while the schedule information indicates a scheduled stop time period.

Further, the control device according to one or more embodiments of the present invention further includes: a schedule information storing section which stores, as the schedule information, schedule information indicative of an operation schedule of a system, the control device controlling the system, which includes a plurality of machines including the first machine and the second machine.

According to the above configuration, it is possible to control the power supply of the second machine at an appropriate timing in consideration of both an actual operating status and the operation schedule of the system including the first machine and the second machine. As a result, it is possible to stop the second machine, for example, at a timing at which the first machine is stopped, while the schedule information indicates a scheduled stop time period, and accordingly possible to suppress wasteful electric power consumption.

Further, the control device according to one or more embodiments of the present invention is arranged such that, in a case where (i) the amount of electric energy of the first machine is less than a first threshold and (ii) the schedule information indicates that a current point in time is included in a scheduled stop time period, the power supply control section carries out a first stopping process in which the power supply control section controls the power supply of the second machine to be turned off.

Further, the control device according to one or more embodiments of the present invention can be arranged such that, in a case where (i) the amount of electric energy of the first machine is less than a first threshold and (ii) the schedule information indicates that a current point in time is included in a scheduled stop time period, the power supply control section carries out a first stopping process in which the power supply control section controls the power supply of the second machine to be turned off or controls the second machine to be in an electric power saving mode.

According to the above configuration, the power supply of the second machine is controlled to be turned off, in a case where the amount of electric energy of the first machine becomes smaller due to the scheduled stop time period. As a result, even in a case where an operator forgets to turn off the power supply of the second machine, the power supply of the second machine is automatically turned off (or the second machine is switched to an electric power saving mode). It is therefore possible to suppress wasteful electric power consumption.

Further, the control device according to one or more embodiments of the present invention can be arranged such that, in a case where a stop signal, causing the first machine to be stopped, has been outputted by a third machine other than the first machine and the second machine, the power supply control section carries out a second stopping process in which the power supply control section controls the power supply of the second machine to be turned off or controls the second machine to be in an/the electric power saving mode.

According to the above configuration, it is determined that the stop signal has been outputted due to occurrence of some trouble or the like with the third machine during a scheduled operation time period. Accordingly, the power supply of the second machine, which is another machine of the system, is controlled to be turned off or the second machine is controlled to be in the electric power saving mode. It is therefore possible to suppress wasteful electric power consumed in standby operation performed by the second machine until the trouble with the third machine is overcome.

Further, the control device according to one or more embodiments of the present invention can be arranged such that, in a case where (i) a state, in which the amount of electric energy of the first machine is smaller than a/the first threshold, has lasted for a given time period or more and (ii) the schedule information indicates that a/the current point in time is included in a scheduled operation time period, the power supply control section carries out a third stopping process in which the power supply control section controls the power supply of the second machine to be turned off or controls the second machine to be in an/the electric power saving mode.

Further, the control device according to one or more embodiments of the present invention can be arranged such that, in a case where (i) a state, in which the amount of electric energy of the first machine is smaller than a/the first threshold, has lasted for a given time period or more, (ii) the schedule information indicates that a/the current point in time is included in a scheduled operation time period, and (iii) no stop signal, causing the first machine to be stopped, has been outputted by a/the third machine other than the first machine and the second machine, the power supply control section carries out a fourth stopping process in which the power supply control section controls the power supply of the second machine to be turned off or controls the second machine to be in an/the electric power saving mode.

According to the above configuration, it is assumed that some trouble or the like occurs with the first machine during the scheduled operation time period. Therefore, the power supply of the second machine is controlled to be turned off or the second machine is controlled to be in the electric power saving mode. As a result, it is possible to suppress wasteful electric power consumed in standby operation performed by the second machine until the trouble with the first machine is overcome.

Further, the control device according to one or more embodiments of the present invention can be arranged such that, after carrying out the first stopping process, the power supply control section carries out a first start-up process in which the power supply control section controls, in accordance with the schedule information, the first machine and the second machine to be started up by next scheduled operation time period at the latest.

Further, the control device according to one or more embodiments of the present invention can be arranged such that the monitoring section also monitors an amount of electric energy of the second machine; and the power supply control section controls, in the first start-up process, one of the first machine and the second machine to be started up, and controls the other of the first machine and the second machine to be started up in accordance with an amount of electric energy of the one of the first machine and the second machine after the one of the first machine and the second machine is started up.

Further, the control device according to one or more embodiments of the present invention can be arranged such that the power supply control section sets start-up starting time in accordance with a difference between (i) a start time of the scheduled stop time period indicated by the schedule information and (ii) a point in time at which the first stopping process is carried out, and carries out the first start-up process in a case where time, elapsed from the point in time at which the first stopping process is carried out, reaches the start-up starting time.

Further, the control device according to one or more embodiments of the present invention can be arranged such that the monitoring section also monitors an amount of electric energy of the third machine; and the power supply control section carries out a second start-up process in which the power supply control section controls the first machine and the second machine to be start up, in a case where the amount of electric energy of the third machine is equal to or more than a second threshold after the power supply control section carries out the second stopping process.

According to the above configuration, it is possible to automatically start up a machine at an appropriate timing, depending on a content of a stopping process.

Further, a control method according to one or more embodiments of the present invention includes the steps of: monitoring an amount of electric energy of a first machine; and controlling power supply of a second machine in accordance with (i) the amount of electric energy of the first machine and (ii) schedule information indicative of an operation schedule of each of the first machine and the second machine. It is therefore possible to bring about an effect substantially identical to the foregoing effect.

The present invention is not limited to the description of the embodiments, but may be altered by a skilled person in the art within the scope of the claims. An embodiment derived from a proper combination of technical means disclosed in different embodiments is also encompassed in the technical scope of the present invention.

Note that each section of the control device 20 of one or more of the embodiments can be achieved in a case where calculating means, such as a CPU (Central Processing Unit) (not illustrated), (i) executes a program stored in storing means, such as a ROM (Read Only Memory) and a RAM (Random Access Memory), and (ii) controls input means such as a key board, output means such as a display, and communicating means such as an interface circuit. Therefore, merely in a case where a computer including these means executes the program by reading a recording medium in which the program is recorded, it is possible to carry out various functions and various processes of a manufacturing line managing device of one or more embodiments of the present invention. Alternatively, by recording the program on a removable recording medium, it is possible to cause any computer to carry out the various functions and the various processes.

A memory (not illustrated) for processing in a microcomputer can be employed as the recording medium. For example, a program medium, such as a ROM, can be employed as the recording medium. Alternatively, a program medium can be employed as the recording medium, the program medium being readable by inserting the recording medium into a program reading device provided as an external storage device (not illustrated).

In either case, the program stored according to one or more embodiments of the present invention is arranged to be executed by access by a microprocessor. Further, the program according to one or more embodiments of the present invention is arranged to be read, then downloaded on a program storage area of the microcomputer, and executed. It is assumed that the program for downloading is stored in advance in the main apparatus.

Note that the program medium is a recording medium arranged to be separable from the main apparatus. Examples of the recording medium include: (i) tapes such as a magnetic tape and a cassette tape; (ii) disks including magnetic disks, such as a flexible disk and a hard disk, and disks, such as a CD, an MO, an MD, and a DVD; (iii) cards such as an IC card (including memory card); and (iv) semiconductor memories such as a mask ROM, EPROM (Erasable Programmable Read-Only Memory), EEPROM (Electrically Erasable Programmable Read-Only Memory) (Registered Trademark), and a flash ROM. All these recording media hold a program in a fixed manner.

Further, in a case of a system configuration connectable to a communication network including the Internet, the recording medium according to one or more embodiments of the present invention is a recording medium which carries a program in a flexible manner so that the program is downloaded from the communication network.

Note that, in a case where the program is downloaded from a communication network in this manner, the program for downloading according to one or more embodiments of the present invention is stored in advance in the main apparatus or installed from another recording medium.

One or more embodiments of the present invention is applicable to a system including a plurality of machines. Examples of the system include a manufacturing line, an inspection line, a classification line, and elevator control system.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

REFERENCE SIGNS LIST

10 Manufacturing line
11 to 14 Wattmeters
20 Control Device
21 Electric energy amount monitoring section (monitoring section)
22 Stop signal monitoring section
23 Stop time period information storing section (schedule information storing section)
24 Stop time period information updating section
25 Stop control section (power supply control section)
26 Start-up control section (power supply control section)
27 First timer section
28 Second timer section

The invention claimed is:

1. A control device comprising:
a monitoring section that monitors an amount of electric energy of a first machine; and
a power supply controller that controls power supply of a second machine in accordance with an amount of electric energy of the first machine and schedule information indicative of an operation schedule of each of the first machine and the second machine,
wherein, in a case where the amount of electric energy of the first machine is less than a first threshold and the schedule information indicates that a current point in time is included in a scheduled stop time period, the power supply controller carries out a first stopping process in which the power supply controller controls the power supply of the second machine to be turned off or controls the second machine to be in an electric power saving mode,
wherein, after carrying out the first stopping process, the power supply controller carries out a first start-up process in which the power supply controller controls, in accordance with the schedule information, the first machine and the second machine to be started up by next scheduled operation time period at the latest, and wherein the power supply controller sets a start-up starting time in accordance with a difference between a start time of the scheduled stop time period indicated by the schedule information and a point in time at which the first stopping process is carried out, and carries out the first start-up process in a case where time, elapsed from the point in time at which the first stopping process is carried out, reaches the start-up starting time.

* * * * *